Feb. 14, 1950
J. S. PANOSIAN
2,497,270
PHOTOGRAPHIC FILM HOLDER LIGHT-SEAL
Filed Jan. 3, 1948
3 Sheets-Sheet 1
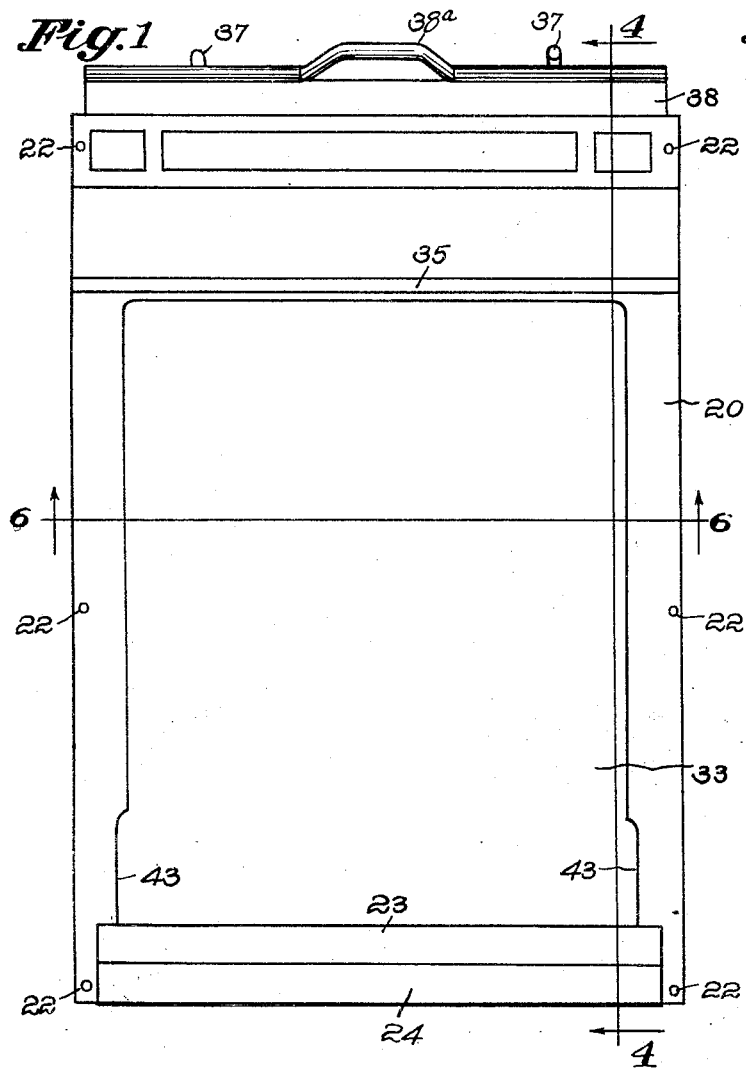
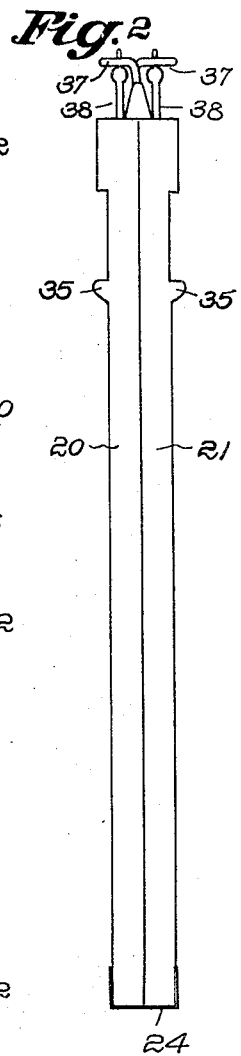
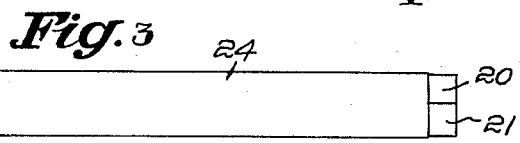
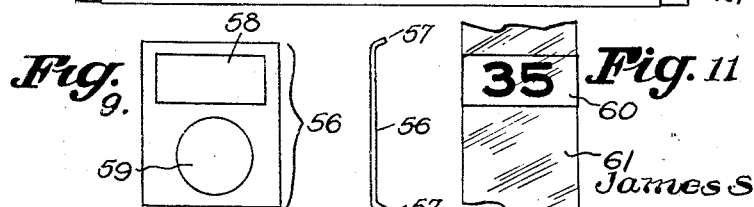
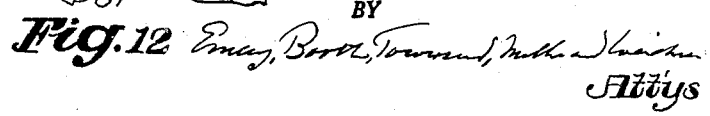
INVENTOR.
James S. Panosian,
BY
Attys

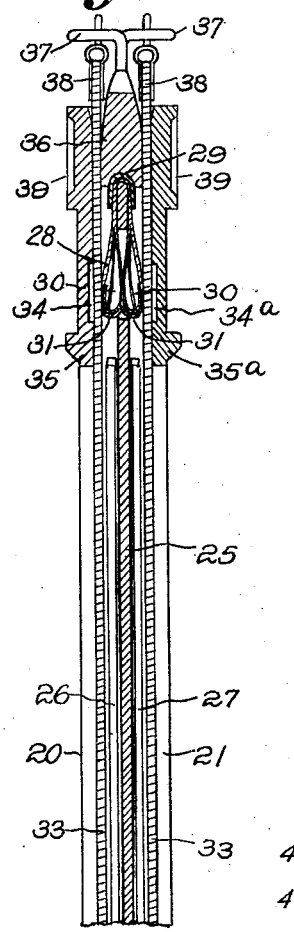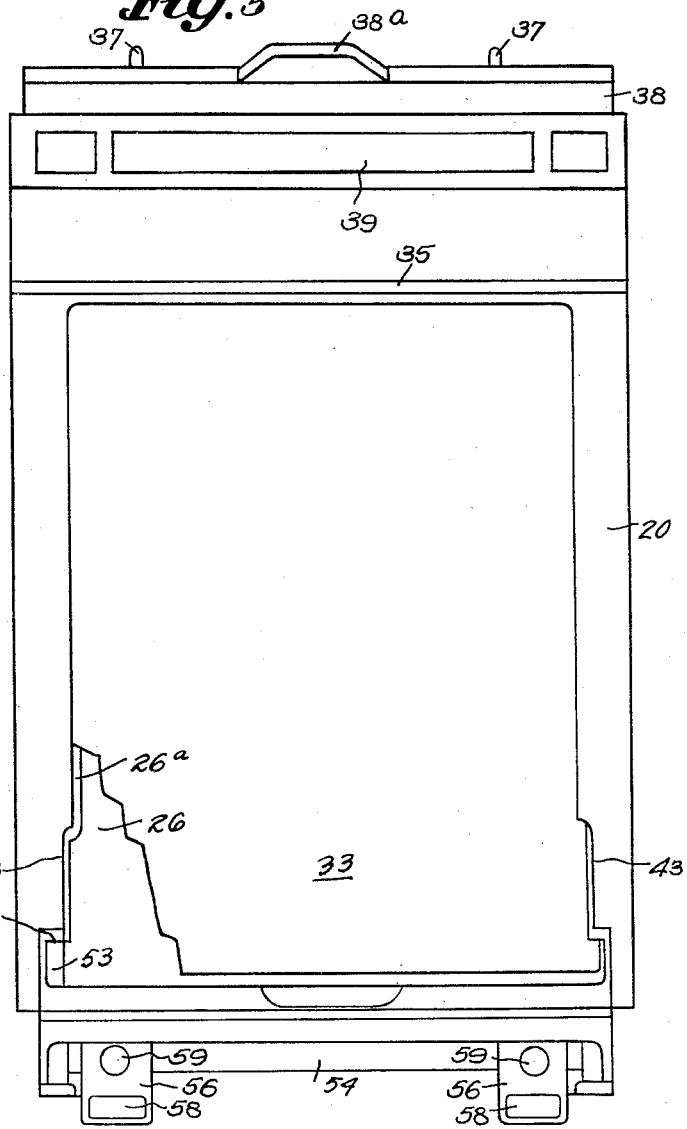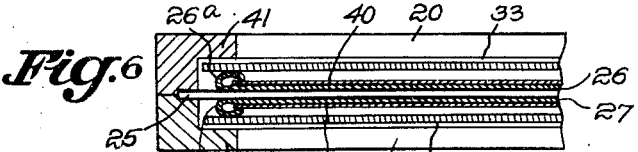

Feb. 14, 1950 J. S. PANOSIAN 2,497,270
PHOTOGRAPHIC FILM HOLDER LIGHT-SEAL
Filed Jan. 3, 1948 3 Sheets-Sheet 3
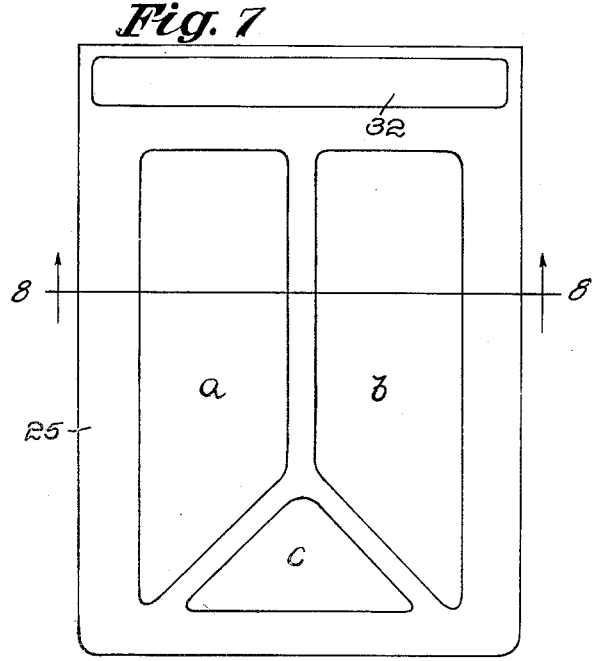
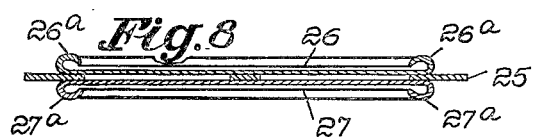
INVENTOR.
James S. Panosian
BY
Emery, Booth, Townsend, Miller and Luistone
Attys Patented Feb. 14, 1950

2,497,270

UNITED STATES PATENT OFFICE 2,497,270

PHOTOGRAPHIC FILM HOLDER LIGHT SEAL

James S. Panoslan, Rochester, N. Y., assignor to Graflex, Inc., Rochester, N. Y., a corporation of Delaware Application January 3, 1948, Serial No. 463

7 Claims. (Cl. 95—67)

This invention relates to a new and improved film holder for use in photographic cameras.

In order that the principle of the invention may be readily understood, I have disclosed a single embodiment thereof in the accompanying drawings, wherein—

Fig. 1 is a front plan view of the film holder;

Fig. 2 is a right-hand side elevation of Fig. 1;

Fig. 3 is a bottom plan view of Fig. 1;

Fig. 4 is an enlarged vertical section through the upper part of the film holder on the line 4—4 of Fig. 1 and showing the construction of the upper part of the film holder;

Fig. 5 is a view similar to Fig. 1, but having one of the lower flaps or hinged cover members in the open position, part of the dark slide being broken away to show more clearly the construction of the holder, with particular reference to the light lock arrangement for the lower flap or hinged cover member;

Fig. 6 is a fragmentary transverse section through Fig. 1 on the line 6—6 thereof;

Fig. 7 is a detail elevation, on a reduced scale, of the center septum supporting grid;

Fig. 8 is a transverse section of Fig. 7 taken on the line 8—8 thereof, but having added thereto the film septum;

Fig. 9 is a top plan view of the film identifying means, marking device or member;

Fig. 10 is an end view of Fig. 9;

Fig. 11 represents a portion of a roll of transparent adhesive tape having a series of film identifying numbers that may be cut therefrom; and Fig. 12 is a vertical edge view of the construction shown in Fig. 9.

There has been developed in the last few years sensitized material of much greater light sensitivity than heretofore. Because of this increased light sensitivity of the sensitized material, it has become increasingly difficult to manufacture a film holder that is light-tight under all operating conditions. Nevertheless the film holder constituting my invention not only meets the conditions for preventing light leaks in the film holder, but at the same time provides a structure that is unusually simple to manufacture and that can be built at reasonable cost. The structural members of the film holder are moldings that can be reproduced either in metal or in several of the well-known plastic materials.

Among the objects of the invention are; to provide a film holder that can be made absolutely light-tight; to provide a light valve or seal for rendering the film holder light-tight in respect to the dark slide, whether or not the dark slide is in position in the film holder or is removed therefrom; to provide a film holder of a small number of parts that can be cheaply produced and so that the holder can be completed through a simple assembly operation; and to provide means for readily identifying film exposed in the holder.

Referring to Fig. 4, fitted between the castings 20 and 21 is a separator plate indicated at 25 and more clearly shown in detail in Fig. 7. The said castings 20 and 21 have grooves cast therein, indicated at 20a and 21a, for receiving the separator plate 25. Attached to the said separator plate 25 are film septums 26 and 27. To the upper end of the separator 25 is attached a light valve or seal indicated at 28, it being desirably attached by means of a clip or U-shaped member 29. The light valve or seal herein shown consists of a comb-like flexible metallic member, indicated at 30, 30, covered by a suitable fabric indicated at 31, 31.

I will now refer generally to all the figures of the drawings.

The separator plate 25 is provided near its upper end with a large transversely extending opening or cutout, indicated at 32 in Fig. 7, that permits the light valve or seal, indicated at 28, to occupy all of the space between the two dark slides 33, 33. While the general construction of the light valve or seal 28 is not of my invention, the construction herein shown, including the opening 32, is new and accomplishes an important result in that by forming such opening 32 in the separator plate 25, much more flexibility is provided for the movements of the light valve or seal, because the opening 32 provides much more space for the light valve or seal. Therefore, the light valve is never compressed to as great an extent as invariably occurs in the usual previous constructions, and the new result is the prevention of distortion of the comb-like, flexible, metallic members 30, 30. The described novel construction constitutes a great improvement over former light valve or seal constructions.

In each of the castings 20 and 21 is provided a recess 34 and 34a, respectively, shown in Fig. 4. The purpose of said recesses is to allow the light valve or seal 28 to occupy the appropriate recess 34 or 34a when either of the slides 33 is removed from the holder, thus providing a light-tight construction.

The septums 26 and 27 are attached to the separator 25 in any well-known manner such as spot welding, riveting or cementing. Separators usually provided in holders of previous constructions have either been made as a solid metal sheet or have had a rectangular hole punched into them to lower the weight of the part. In my novel separator construction, most clearly shown in Figs. 7 and 8, the separator is shown as in the form of an open grid having openings, a, b, c. I thus achieve a separator of light weight and at the same time retain the rigidity of a solid separator. In addition, I thereby provide means for supporting the septums in the center. This construction has proved to be superior to former constructions with which I am familiar.

Integral with the castings 20 and 21 are cast keys 35 and 35a which serve to retain the holder in the camera and also to provide an additional light lock. The holder is provided with a cross member 36 which forms a guide for the dark slides 33 and into which cross member 36 are threaded dark slide locks 37, 37. The cross member 36 also acts as a supporting member to retain the light valve or seal 28 and the separate plate 25 in position in the holder. To the upper end of the dark slides 33 is fitted a metal handle 38 formed with a loop 38a. The uppermost portion of the castings 20 and 21 is of a channel construction, indicated at 39, to form a handle-like recessed construction for removing the holder from the camera.

Particularly referring to Figs. 4 and 6, it will be noted that the septums 26 and 27 are provided with curled-over ends and sides 26a and 27a for holding the sensitized material 40. The curled-over sides 26a and 27a of the septums 26 and 27 respectively, also form guides for the dark slides 33, 33. A lip or extending portion of castings 20 and 21, indicated at 41 and 42, forms an outer guide for the dark slides 33. The lower ends of the castings 20 and 21 are provided, as best shown in Figs. 1 and 5, with cut-outs, indicated at 43, to provide an easy means for inserting sheet film in septums 26 and 27.

I will next refer to the novel film-identifying or marking device.

I have for this purpose provided in the lower part of the film holder transversely extending dovetail slots or recesses for receiving such film-identifying device 56, which is shown in place in Fig. 5, the construction of which is most clearly shown in Figs. 9 to 12.

In Fig. 9, wherein the construction is inverted from that shown in Fig. 5, is shown a top plan view of the film-identifying or marking device 56 which is made of either metal or a plastic material, and the upper and lower ends of which are provided with legs or bent-over portions 57 for engaging the said dovetail recesses or slots.

In the film-identifying or marking device, I provide an opening 58 into which will be applied a number or other indicating notation and a second hole 59 that may be of any suitable shape. The said film-identifying or marking device can be readily inserted into said dovetail recesses or slots, or be readily removed therefrom. When in place, the structure will appear as in Fig. 5.

To provide convenient means of changing numbers as applied to the film-identifying or marking device 56, a number, such as 35 shown at 60 in Fig. 11, can be cut from a roll of transparent material having suitable numbers which may be made up in any suitable manner so as, for example, to provide numbers from 1 to 50 or 1 to 100. The transparent material may also be supplied in sheets having numbers that can be cut out therefrom. In the embodiment shown, the numeral 35 is laid over the opening 58 of the film-identifying or marking device 56 and held thereto by a small piece of transparent adhesive tape 61, and when the number-holding film-identifying or marking member 56 is properly located in either of said dovetail recesses, slight pressure by the finger over the opening 59 will depress the adhesive tape through such opening 59 into contact with the flap body, thus securely holding the film-identifying or marking device in place.

Any suitable form of numbers can be used. For example, as shown in Fig. 11, the number is opaque and the surrounding area is transparent. The numbering device may, in accordance with my invention, be made in the reverse manner, having a transparent number surrounded by an opaque background. A fluorescent material may be used for applying the numbers either of the type requiring activation by exposure to light or activation by radioactive bombardment. The described structure provides a novel numbering system wherein the type of numbering used is that applied by light coming through the lens on the exposure or by fluorescent illumination, or by both.

In Fig. 5 the flap is shown in the open position. Therefore, the film-identifying or marking device 56 is not in contact with the film 40. However, when the flaps are in closed condition, as shown in Fig. 1, the film-identifying or marking devices 56 are in contact with the sensitized material 40, and when an exposure is made the dark slide 33 is withdrawn and the number or other identifying means will be printed on the sensitized material 40, either because of the light coming through the lens in making the exposure or if a fluorescent type of material is used, the exposure on the film will commence as soon as the flap is closed.

The sensitized material holder herein disclosed provides an improved light valve or seal, an improved septum carrier, and a new negative identification means. Such holder is very economical to manufacture, and at a lower cost than any holder known to me, and moreover the holder is absolutely light-tight.

Having thus described one illustrative embodiment of the invention, it is to be understood that although specific terms are employed, they are used in a generic and descriptive sense, and not for purposes of limitation, the scope of the invention being set forth in the following claims.

I claim:

1. A rectangular film holder for photographic cameras having two dark slides, a medianly positioned separator plate having a prolonged transversely-extending opening near its upper end, a light valve or seal extending downwardly from the upper cross portion of the holder, said light valve or seal having opposite depending portions received in said opening of the separator plate from opposite faces of said separator plate, thereby occupying all the space between said two dark slides, the said upper cross portion of the holder being provided with a recess along the lower edge thereof, and the light valve or seal being positioned and held in said recess.

2. A rectangular film holder for photographic cameras having two dark slides, a medianly positioned separator plate having a prolonged transversely-extending opening near its upper end, a light valve or seal extending downwardly from the upper cross portion of the holder, said light valve or seal having opposite depending portions received in said opening of the separator plate from opposite faces of said separator plate, thereby occupying all the space between said two dark slides, the lower edge of the upper cross portion of the holder being provided with a recess extending lengthwise thereof, the middle folded part of the light valve or seal being received in said recess, and the top of the said separator plate holding the light valve or seal in position in said recess.

3. A duplex film holder for photographic cameras comprising two rectangular mating members having means to receive between them a cross member, a cross member in said receiving means of said two mating members at the upper end thereof and thereby held in place, a light valve or seal positioned at its top wholly at the lower edge of said cross member and extending wholly below said cross member, a thin separator plate structurally separate and distinct from said cross member and extending from the lower edge thereof to the lower cross portion of said two rectangular mating members, said thin separator plate near its upper end, and therefore substantially below the cross member, having a long transversely extending opening parallel with the lower edge of said cross member, to receive and accommodate the said light valve or seal, thereby permitting the latter to occupy all of the space between the said two positioned dark slides adjacent the upper end thereof, preventing undue compression of the light valve or seal and providing marked flexibility for the movements thereof, said light valve or seal being held in position between the lower edge of said cross member and the upper edge of said separator plate in engagement with both of said edges.

4. A film holder for photographic cameras in accordance with claim 3, said separator plate below said transversely extending opening being formed as an open grid having a bar thereof extending substantially centrally longitudinally of the separator plate, and a film septum attached to each face of the separator plate and supported by said longitudinally extending grid bar.

5. A film holder for photographic cameras in accordance with claim 3, wherein the light valve or seal extends downwardly from the lower edge of the cross member of the holder, and has opposite depending portions, both of which are received in the said transverse opening of the separator plate from opposite faces of the said separator plate.

6. A film holder for photographic cameras comprising two mating, open, rectangular members secured together in face-to-face relation and each consisting of two upright side parts and top and bottom cross parts, a cross member structurally separate from said two open rectangular members, but received between the upper cross parts thereof at the upper end of said film holder, two dark slides receivable in said mating members respectively, said cross member having a separator-plate-receiving transverse recess extending along its entire lower edge, a transversely folded light valve or seal readily-removably received along its folded median transverse line in said recess, a light-weight separator plate non-contacting with and non-secured directly to said two mating, open, rectangular members when in functioning position, but having its upper edge engaging the inner surface of said light valve or seal along said median transverse line of fold, and thereby merely frictionally holding the said light valve or seal in the said transverse recess, thus permitting the ready insertion of said light valve or seal and said separator plate into functioning position between said two mating, open, rectangular members in assembling the parts of said film holder.

7. A film holder for photographic cameras in accordance with claim 6, but wherein the said separator plate below the positioned light valve or seal is formed as a wholly open rectangular structure excepting for a longitudinally extending central bar to the opposite faces of which two imperforate film-receiving septums are respectively attached, said two septums having curled-over film-receiving side edges between which are located the longitudinally extending side edges of the separator plate.

JAMES S. PANOSIAN.

REFERENCES CITED

The following references are of record in the file of this patent:

UNITED STATES PATENTS

| Number | Name | Date |
| --- | --- | --- |
| 355,056 | Bowdish | Dec. 28, 1886 |
| 427,322 | Hein | May 6, 1890 |
| 463,705 | Perry | Nov. 24, 1891 |
| 628,889 | Lewis | July 11, 1899 |
| 708,370 | Lewis | Sept. 2, 1902 |
| 787,424 | Wright | Apr. 18, 1905 |
| 1,641,420 | Folmer | Sept. 6, 1927 |
| 2,188,843 | Pappajion | Jan. 30, 1940 |
| 2,203,912 | Levin | June 11, 1940 |
| 2,268,417 | Neuschafer | Dec. 30, 1941 |
| 2,315,987 | Smith | Apr. 6, 1943 |
| 2,326,075 | Smith | Aug. 3, 1943 |
| 2,410,919 | Aiken | Nov. 12, 1946 |
| 2,431,356 | Willcox | Nov. 25, 1947 |